US008559162B2

(12) United States Patent
Shen et al.

(10) Patent No.: US 8,559,162 B2
(45) Date of Patent: Oct. 15, 2013

(54) MESOPOROUS CARBON MATERIAL, FABRICATION METHOD THEREOF AND SUPERCAPACITOR

(75) Inventors: Bo-Jiun Shen, Taoyuan Hsien (TW); Duo-Fong Huang, Taoyuan Hsien (TW); Chi-Chang Chen, Taoyuan Hsien (TW); Hui-Ling Wen, Taoyuan Hsien (TW); Rong-Chang Liang, Cupertino, CA (US)

(73) Assignee: Delta Electronics, Inc., Taoyuan Hsien (TW)

( * ) Notice: Subject to any disclaimer, the term of this patent is extended or adjusted under 35 U.S.C. 154(b) by 260 days.

(21) Appl. No.: 12/962,026

(22) Filed: Dec. 7, 2010

(65) Prior Publication Data

US 2011/0134585 A1 Jun. 9, 2011

Related U.S. Application Data

(60) Provisional application No. 61/267,315, filed on Dec. 7, 2009.

(51) Int. Cl.
*H01G 9/00* (2006.01)

(52) U.S. Cl.
USPC ........... 361/502; 361/503; 361/504; 361/509; 361/512; 361/519

(58) Field of Classification Search
USPC .......... 361/502, 503–504, 509, 512, 516–519
See application file for complete search history.

(56) References Cited

U.S. PATENT DOCUMENTS

| 3,288,641 | A | 11/1966 | Rightmire |
| 6,297,293 | B1 | 10/2001 | Bell |
| 6,515,845 | B1 | 2/2003 | Oh |
| 6,737,445 | B2 | 5/2004 | Bell |
| 2004/0047798 | A1 | 3/2004 | Oh |
| 2007/0116624 | A1 | 5/2007 | Joo |
| 2009/0092747 | A1* | 4/2009 | Zhamu et al. ............ 427/80 |

FOREIGN PATENT DOCUMENTS

| CN | 1696180 A | 11/2005 |
| CN | 101134567 A | 3/2008 |
| CN | 100395310 C | 6/2008 |
| CN | 101244818 A | 8/2008 |
| WO | WO-01/19904 A1 | 3/2001 |

OTHER PUBLICATIONS

Yu et al., "Ordered Mesoporous Nanocrystalline Titanium-Carbide/Carbon Composites from In Situ Carbothermal Reduction," Advanced Materials, 2007, 19, pp. 2301-2306.

* cited by examiner

*Primary Examiner* — Nguyen T Ha
(74) *Attorney, Agent, or Firm* — Muncy, Geissler, Olds & Lowe, PLLC

(57) ABSTRACT

A mesoporous carbon material, a fabrication method thereof and a supercapacitor containing the mesoporous carbon material are provided. The mesoporous carbon material includes a plurality of carbon nanotubes (CNTs) and/or metal particles and/or metal oxide particles, and a carbon matrix. The mesoporous carbon material has a plurality of mesopores formed by the carbon matrix and the carbon nanotubes and/or the metal particles and/or the metal oxide particles. The plurality of carbon nanotubes, and/or the metal particles and/or the metal oxide particles are formed substantially adjacent to the plurality of mesopores.

11 Claims, 12 Drawing Sheets

MESOPOROUS CARBON MATERIAL, FABRICATION METHOD THEREOF AND SUPERCAPACITOR

CROSS REFERENCE TO RELATED APPLICATIONS

This application claims the benefit of U.S. Provisional Application No. 61/267,315 filed Dec. 7, 2009, the entirety of which is incorporated by reference herein.

BACKGROUND OF THE INVENTION

1. Field of the Invention

The present invention relates to a mesoporous carbon material, a fabrication method thereof and a supercapacitor using the mesoporous carbon material as an activated material, and more particularly to a method for fabricating a mesoporous carbon material containing carbon nanotubes (CNTs) and/or metal particles and/or metal oxide particles.

2. Description of the Related Art

Recently, development of supercapacitors for the load leveling of electric power sources, including batteries (e.g. rechargeable cells) and fuel cells has become very important, for new mobile communication and electric vehicles that require high pulse power. By connecting in parallel electrochemical capacitors having excellent power output to batteries or fuel cells having high energy density, it is possible to satisfy pulse power output needs and extend the lifetime of batteries and fuel cells.

In general, electrochemical capacitors are classified into electric double-layer capacitors (EDLCs) and pseudo capacitors. EDLCs store electricity by charging ions on electrolytes and electrons on electrodes, respectively, at an electric double layer formed at an electrode/electrolyte interface. The pseudo capacitors store electricity near the electrode surface by using faradaic reaction.

The electric double layer capacitor is composed of an equivalent circuit wherein double-layer capacitance and equivalent series resistance (ESR) are connected in series. The double-layer capacitance is proportional to the surface area of the electrode, and the ESR is the sum of electrode resistance, electrolyte solution resistance, and electrolyte resistance in the electrode pores. The electric charges stored in the double-layer capacitance decrease as the charge/discharge rate increases, wherein the ESR determines the degree of storage decrease. Namely, the storage amount of the charges decrease as the ESR increases and such phenomenon becomes larger as the charge/discharge rate increases.

Generally, the electrode materials for electric double layer capacitors should have the following characteristics: (1) high surface area for high double-layer capacitance; (2) high electrical conductivity for low electrode resistance and (3) low resistance from the electrolyte in the pores of electrode.

Currently, powder and activated carbon fiber forms have been used as the electrode material of EDLCs, but these activated carbons have the following shortcomings, when related to the above-mentioned requirements for EDLCs.

First, the activated carbons are composed of irregular and tortuous micropores (below 2 nm), mesopores (2 nm to 50 nm) and macropores (over 50 nm), which hinders performance of conductivity of the electrode material of electric double layer capacitors. Thus, it is difficult to improve the efficiency of conductivity to be greater than 50%. Also, electrolyte wetting of the micropores is not so easy, and the surfaces exposed in the micropores may not be utilized for charge-discharge capacity. Moreover, even if electrolyte wetting of the micropores is sufficient for ionic transferring in the small and tortuous pores, it does not substantially increase surface area, thus, negating one of the advantages belonging to electric double layer capacitors. Also, if the pores are irregular and tortuous, the charge-discharge capacity and ionic transferring rate capability are further hindered. It is generally accepted that pore sizes greater than 1 nm is desirable for the electrode materials of electric double layer capacitors in an aqueous electrolyte media, and pore sizes greater than 2 nm for those in an organic electrolyte media.

Second, the activated carbons have low electrical conductivity. Carbon materials with high conductivity can be achieved by a thermal treatment process for graphitization. However, the process drastically decreases the specific surface area, which provides the electric double layer surface. Conductive additives such as carbon black or metal powder can be mixed to activate carbons to increase electric conductivity, which in turn, decreases ESR, which, however, will also decrease capacitance per weight or volume. Moreover, the conventional method does not improve the conductivity for the carbon materials.

BRIEF SUMMARY OF THE INVENTION

The present invention provides a method to synthesis a mesoporous carbon material containing conductive materials, which can be embedded in the carbon matrix or disposed on at least part of the inner surfaces of the carbon matrix within the mesopores. The mesoporous carbon material not only contains uniform and controllable mesopores to provide channels for electronic or ion diffusion, but also contains conductive metal and/or metal oxide to improve the conductivity of the mesoporous carbon materials. The form of the metal and/or the metal oxide can be particle or film. The conductivity of the mesoporous carbon material can be enhanced by adding single-wall and/or multi-wall carbon nanotubes (SCNTs and/or MCNTs), during the fabrication process of the mesoporous carbon material. The mesoporous carbon material can be used in sensors or energy storage devices, such as supercapacitors, batteries, and fuel cells.

According to an embodiment of the present invention, a carbon material for an energy storage device is provided. The carbon material, having a plurality of mesopores, includes a carbon matrix and a conductive material embedded in the carbon matrix, wherein the plurality of mesopores are formed by the carbon matrix and the conductive material.

According to an embodiment of the present invention, a carbon material for an energy storage device is provided. The carbon material, having a plurality of mesopores, includes a carbon matrix and a conductive material disposed on at least part of inner surfaces of the mesopores of the carbon matrix, wherein the plurality of mesopores are formed by the carbon matrix and the conductive material.

According to an embodiment of the present invention, a method for fabricating a mesoporous carbon material is provided. The method includes: providing a mesophasic lyotropic surfactant; mixing a precursor of conductive material, a polymer material and the mesophasic lyotropic surfactant together to form a mixture; reacting the mixture to form a plurality of conductive particles; removing the mesophasic lyotropic surfactant from the mixture; and performing a thermal treatment for carbonizing the polymer material.

According to an embodiment of the present invention, a method for fabricating a mesoporous carbon material includes: providing a mesophasic lyotropic surfactant; mixing a precursor of conductive film, a polymer material and the mesophasic lyotropic surfactant together to form a mixture;

removing the mesophasic lyotropic surfactant from the mixture; and performing a thermal treatment for carbonizing the polymer material.

According to an embodiment of the present invention, a method for fabricating a mesoporous carbon material includes: providing a lyotropic surfactant; mixing a conductive material, a polymer material and the lyotropic surfactant together to form a mixture; removing the lyotropic surfactant from the mixture; and performing a thermal treatment for carbonizing the polymer material.

According to an embodiment of the present invention, a method for fabricating a mesoporous carbon material includes: providing a lyotropic surfactant; mixing a precursor of conductive material, a polymer material and the lyotropic surfactant together to form a mixture; removing the lyotropic surfactant from the mixture; and performing a thermal treatment for carbonizing the polymer material.

According to an embodiment of the present invention, an electrode including an activated material having the above mentioned mesoporous carbon material is provided.

According to an embodiment of the present invention, a supercapacitor including the above mentioned electrode is provided.

According to an embodiment of the present invention, a supercapacitor is provided. The supercapacitor includes a plurality of electrodes, at least one separator inserted between the electrodes, and an electrolyte solution infiltrated in the electrodes and the separators, wherein at least one electrode includes the above mentioned mesoporous carbon material as an activated material.

BRIEF DESCRIPTION OF THE DRAWINGS

The present invention can be more fully understood by reading the subsequent detailed description and examples with references made to the accompanying drawings, where.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1B:
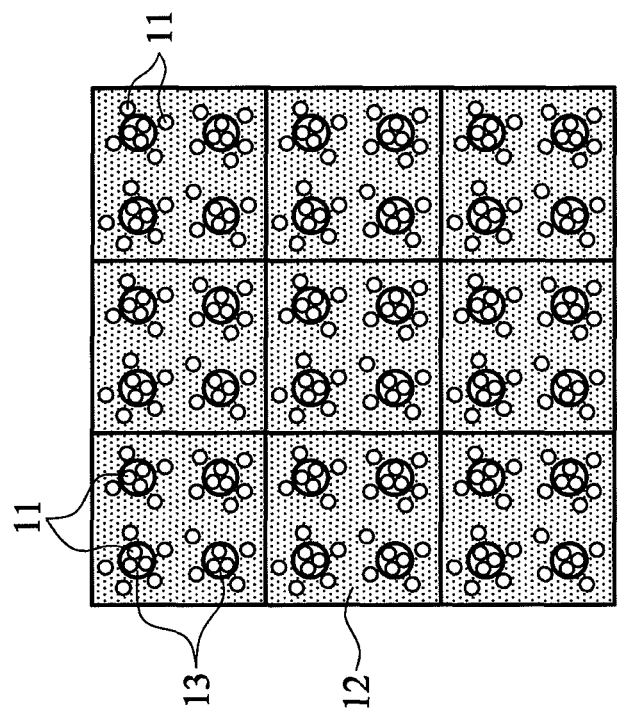
FIGS. 1A to 1D are schematic diagrams respectively showing a two-dimensional plane view of a hexagonal closed packed structure and a cubic closed packed structure of the mesoporous carbon material according to embodiments of the present invention.
Figure 1A:
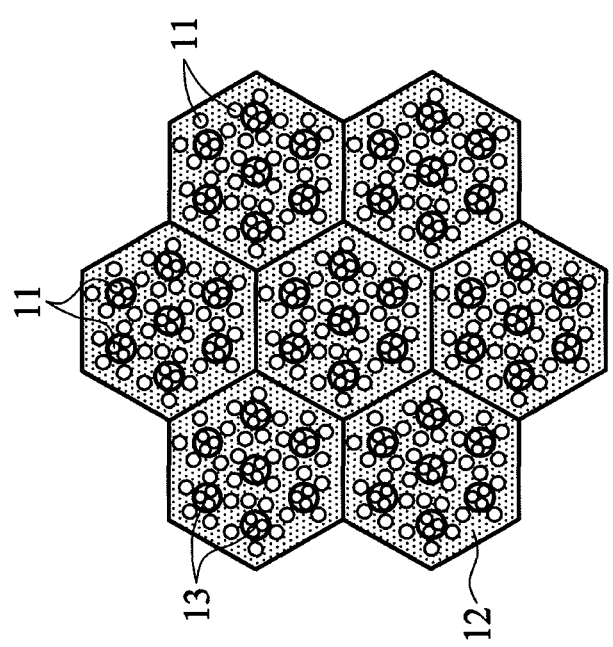

Referring to FIGS. 1A and 1B, a mesoporous carbon material includes a plurality of carbon nanotubes (CNTs), and/or metal particles and/or metal oxide particles 11 and a carbon matrix 12. The mesoporous carbon material has a plurality of mesopores 13 formed by the carbon matrix 12 and the carbon nanotubes (CNTs), and/or the metal particles and/or the metal oxide particles 11. Moreover, the carbon nanotubes (CNTs), and/or the metal particles and/or the metal oxide particles 11 may be disposed on at least part of inner surfaces of the mesopores 13.

Figure 1D:
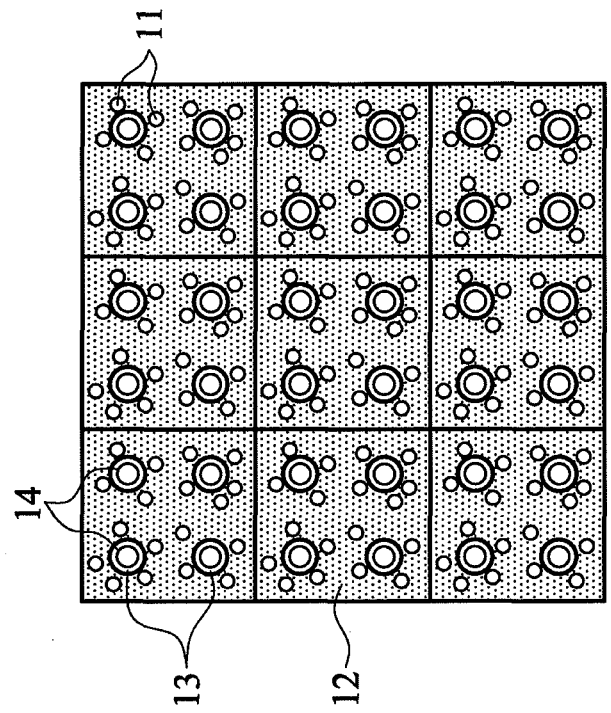
Figure 1C:
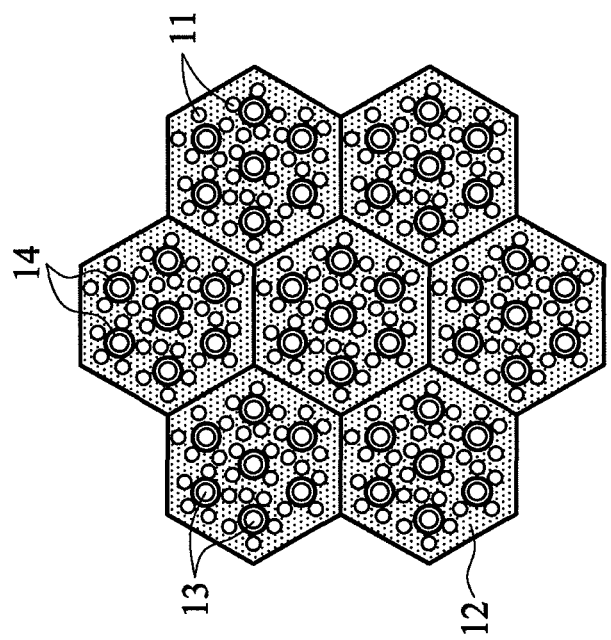

Referring to FIGS. 1C and 1D, a mesoporous carbon material includes a plurality of carbon nanotubes (CNTs), and/or metal particles and/or metal oxide particles 11 and a carbon matrix 12. The mesoporous carbon material has a plurality of mesopores 13 formed by the carbon matrix 12 and the carbon nanotubes (CNTs), and/or the metal particles and/or the metal oxide particles 11. Moreover, a conductive film 14 may be formed on inner surfaces of the mesopores 13.

The plurality of the carbon nanotubes (CNTs), and/or the metal particles and/or the metal oxide particles 11 and the conductive film 14 are formed substantially adjacent to the plurality of mesopores 13. The plurality of mesopores 13 are uniformly arranged in a hexagonal closed packed structure as shown in FIGS. 1A and 1C, or a cubic closed packed structure as shown in FIGS. 1B and 1D.

At least 75% of the amount of the plurality of mesopores 13 have pore diameters which are 0.6 times to 1.4 times an average pore diameter of the plurality of mesopores 13. In other words, at least 75% of the amount of the plurality of mesopores 13 have pore diameters that fall in a range between subtracting 40% of the average pore diameter from the average pore diameter and adding 40% of the average pore diameter on the average pore diameter. The size of at least a part of the metal particles and the metal oxide particles is less than 50 nm. The material of at least a part of the metal particles or the conductive film 14 is Ti, Pt, Ag, Au, Al, Ru, Fe, V, Ce, Zn, Sn, W, Ni, Co, Mn, In, Os, Cu or Nb, wherein Mn, Co, Ni, Pt, Cu, Ag or Au is preferred. The material of at least a part of the metal oxide particles or the conductive film 14 is oxide of Ti, Pt, Ag, Au, Al, Ru, Fe, V, Ce, Zn, Sn, W, Ni, Co, Mn, In, Os, Cu or Nb, wherein ZnO or CoO is preferred. The carbon nanotubes (CNTs) may be single-well carbon nanotubes (SCNTs), multi-well carbon nanotubes (MCNTs) or a combination thereof. Moreover, the conductivity of the mesoporous carbon material can be enhanced by adding the single-wall and/or the multi-wall carbon nanotubes in the process of fabricating the mesoporous carbon material.

Figure 2A:
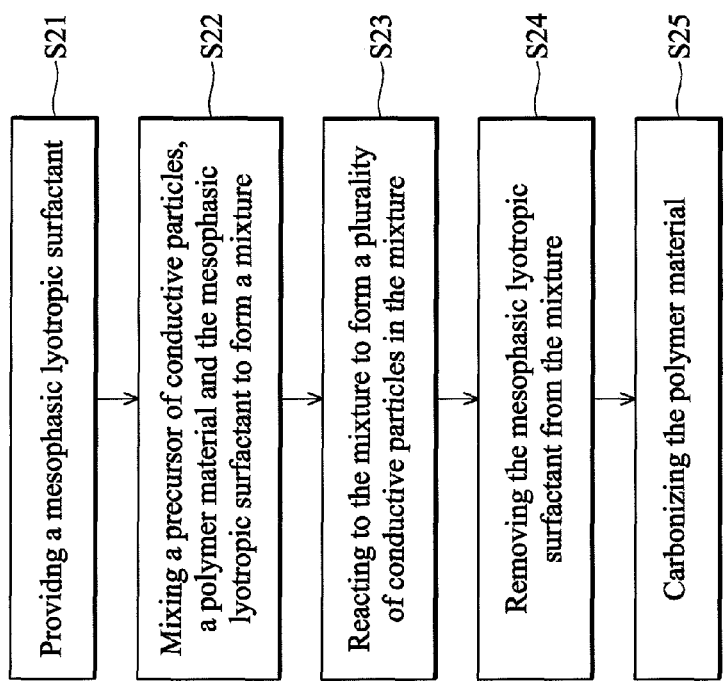
FIG. 2A is a flow chart showing a method for fabricating a mesoporous carbon material according to an embodiment of the present invention.

FIG. 2A shows a method for fabricating the mesoporous carbon material according to an embodiment of the present invention. The method includes the steps S21 to S25 as follows.

In step S21, a mesophasic lyotropic surfactant is provided.

In step S22, a precursor of conductive particles, for example a precursor of metal particles and/or a precursor of metal oxide particles, a polymer material and the mesophasic lyotropic surfactant are mixed to form a mixture.

In step S23, reacting to the mixture, such as adjusting the pH value of the mixture, or hydrolyzing and condensing the mixture is performed to form a plurality of conductive particles, for example a plurality of metal particles and/or metal oxide particles in the mixture.

In step S24, the mesophasic lyotropic surfactant is removed from the mixture. The mesophasic lyotropic surfactant can be removed by a water-washing process, a solvent extraction process or a heating process, wherein the heating process is preferably performed at a temperature between 200° C. and 600° C. The method further includes a step of drying the mixture after removing the mesophasic lyotropic surfactant from the mixture.

In step S25, the polymer material is carbonized by a thermal treatment. The thermal treatment is preferably performed at a temperature between 600° C. and 1500° C. for carbonizing the polymer material.

Figure 2B:
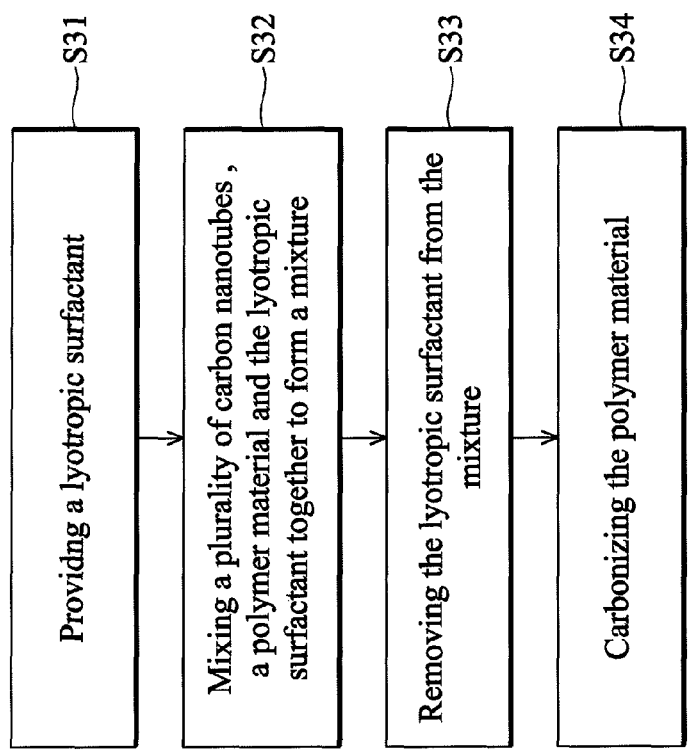
FIG. 2B is a flow chart showing a method for fabricating a mesoporous carbon material according to another embodiment of the present invention.

FIG. 2B shows a method for fabricating the mesoporous carbon material according to another embodiment of the present invention. The method includes the steps S21 to S25 as follows.

In step S31, a lyotropic surfactant is provided.

In step S32, a plurality of carbon nanotubes (CNTs), a polymer material and the lyotropic surfactant are mixed to form a mixture.

In step S33, the lyotropic surfactant is removed from the mixture. The lyotropic surfactant can be removed by a water-washing process, a solvent extraction process or a heating process, wherein the heating process is preferably performed at a temperature between 200° C. and 600° C. The method further includes a step of drying the mixture after removing the lyotropic surfactant from the mixture.

In step S34, the polymer material is carbonized by a thermal treatment. The thermal treatment is preferably performed at a temperature between 600° C. and 1500° C. for carbonizing the polymer material.

The polymer material serves as a precursor of the carbon matrix. The polymer material is preferably an organic polymer material such as one or a mixture of two or more than two selected from the group consisting of polyvinyl alcohol (PVA), polyvinylpyrrolidone (PVP), hydroxy ethyl cellulose (HEC), carboxymethyl cellulose (CMC), polyaniline, polypyrrole, polythiophene, furfural-based resins and phenolic resin. In one embodiment of the present invention, the precursor of metal particles and the precursor of metal oxide particles are one or a mixture of two or more than two selected from the group consisting of nitrate, sulfuric salt, phosphate, perchlorate, halide, inorganic metal salt and metal alkoxide of a transition metal element. The transition metal element is preferably Ti, Pt, Ag, Au, Al, Ru, Fe, V, Ce, Zn, Sn, W, Ni, Co, Mn, In, Os, Cu or Nb. The mesophasic lyotropic surfactant serves as a structure-directing agent. The mesophasic lyotropic surfactant is preferably a block copolymer surfactant.

Figure 3:
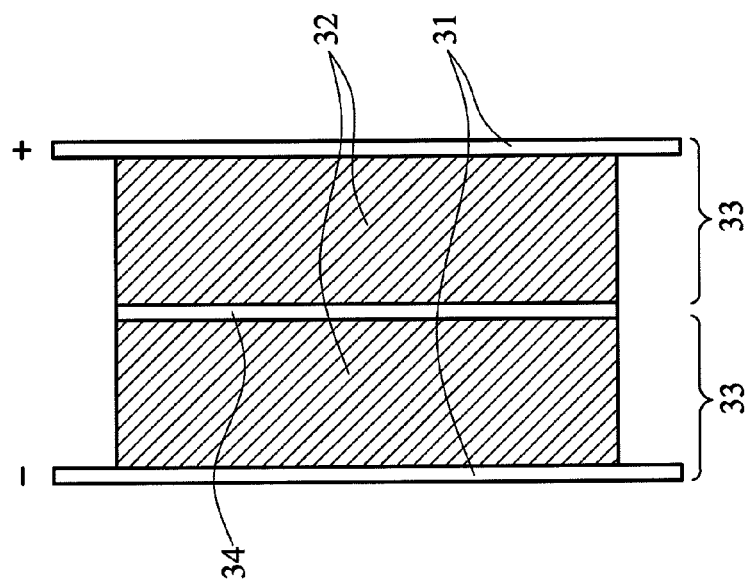
FIG. 3 is a schematic diagram showing a plane view of a supercapacitor according to an embodiment of the present invention.

FIG. 3 shows an embodiment of a supercapacitor according to an embodiment of the present invention. The supercapacitor includes a plurality of electrodes 33, a separator 34 inserted between any two adjacent electrodes 33 and an electrolyte solution (not shown) infiltrated in the electrodes 33 and the separator 34. The electrode 33 is made by applying the mesoporous carbon material 32 of the embodiments of the present invention to a current collector 31, wherein the mesoporous carbon material 32 serves as an activated material.

The materials, the fabrication processes and the mesoporous carbon materials of the present invention are described in detail by the Examples below.

Example 1

Figure 4:
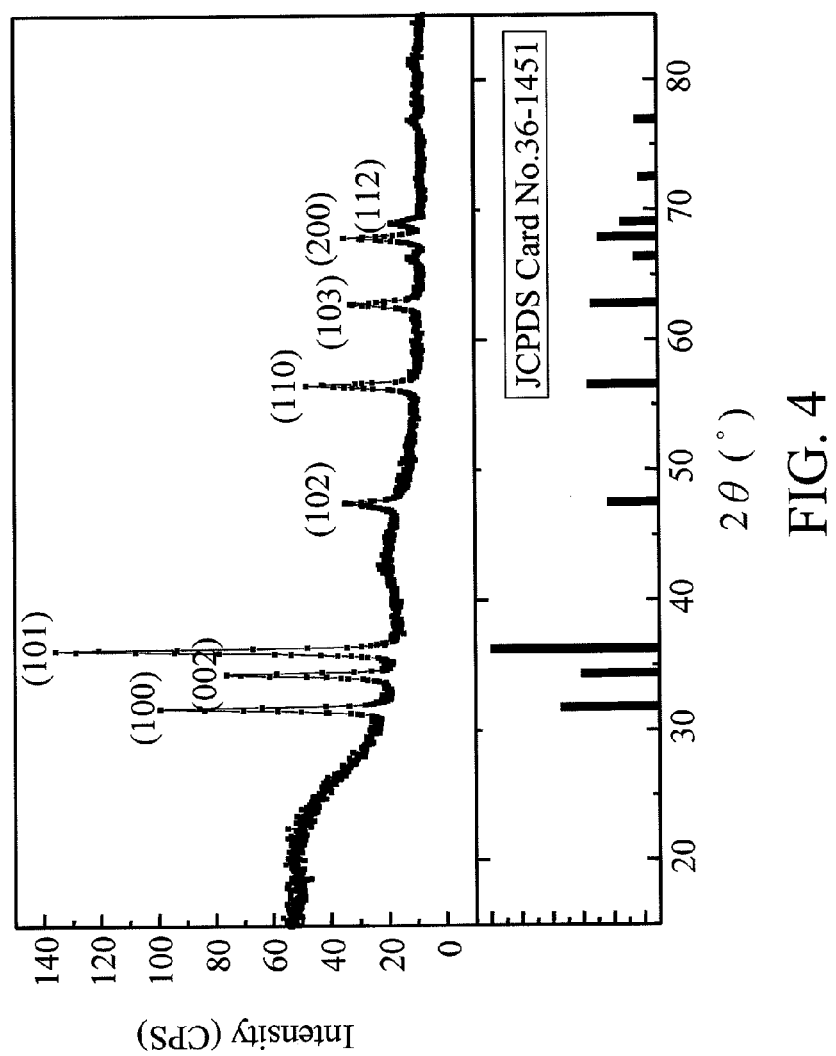
FIG. 4 is an X-ray diffraction analysis spectrum of the mesoporous carbon-zinc oxide composite of the example 1.
Figure 5:
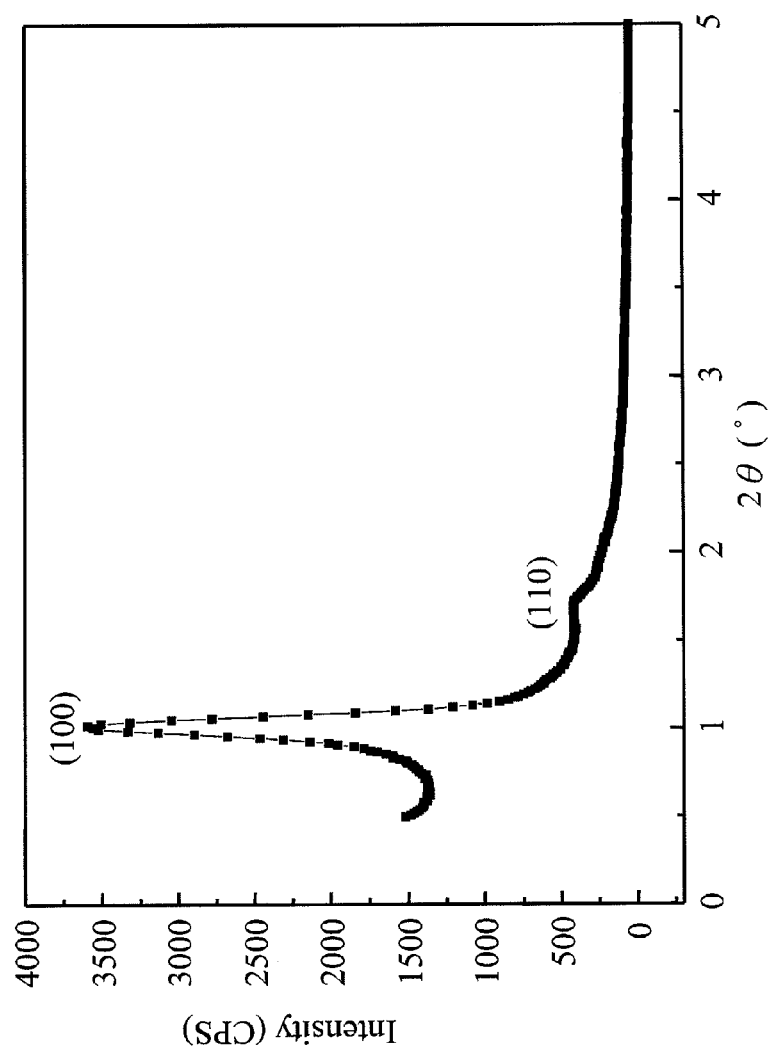
FIG. 5 is a small-angle X-ray diffraction pattern of the mesoporous carbon-zinc oxide composite of the example 1.
Figure 6:
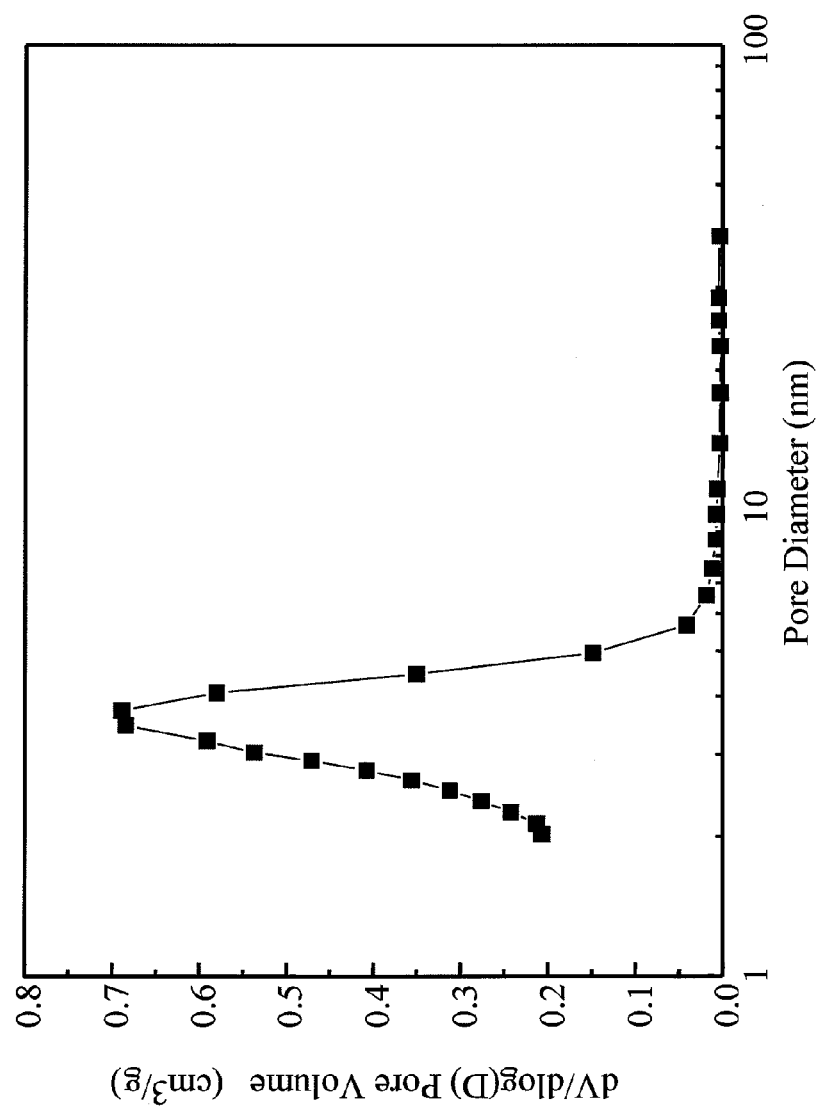
FIG. 6 is a plot for the pore size distribution of the mesoporous carbon-zinc oxide composite of the example 1.

Synthesis of Carbon-Zinc Oxide Composite 1.0 g of F127 ($EO_{106}PO_{70}EO_{106}$) (a mesophasic lyotropic surfactant) and 0.1 g of zinc acetate were dissolved in 18 g of ethanol and stirred to form a clear solution. Then, 1.3 g of 77 wt % phenolic resin was added to the above solution. After stirring for 2 hours, the mixture was transferred into dishes to evaporate ethanol at room temperature for 10-16 hours. Then, it took 24 hours at 100° C. in an oven to make the phenolic resin solidify (thermopolymerized). The product, an F127/zinc compound/polymer composite was obtained. Finally, a calcination process was carried out in a tubular furnace under $N_2$ flow at 600° C. for 3 hours to obtain the mesoporous carbon-zinc oxide composite of Example 1. The mesoporous carbon-zinc oxide composite of Example 1 exhibited an ordered hexagonal closed packed structure as evidenced from FIGS. 4 and 5, and the specific surface area and pore diameter of the composite were 562 $m^2/g$ and approximately 3.8 nm, respectively, as shown in FIG. 6.

Example 2

Figure 7:
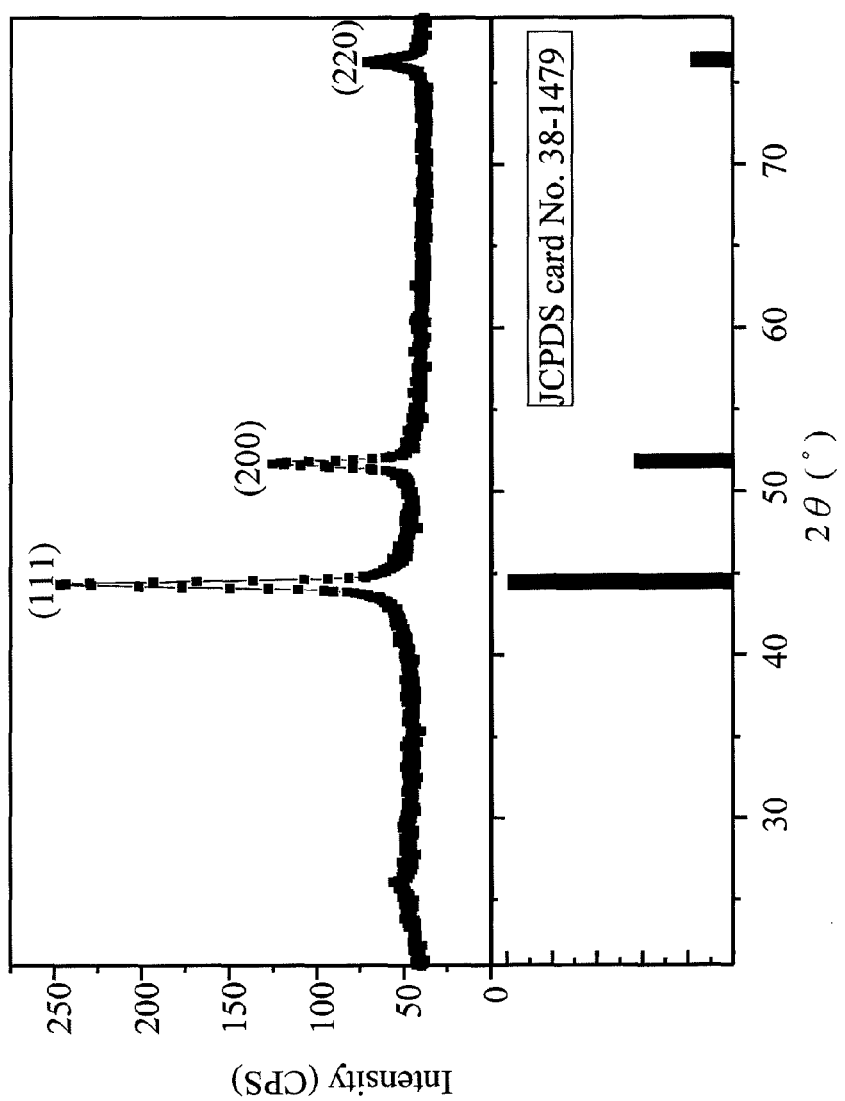
FIG. 7 is an X-ray diffraction analysis spectrum of the mesoporous carbon-nickel composite of the example 2.
Figure 8:
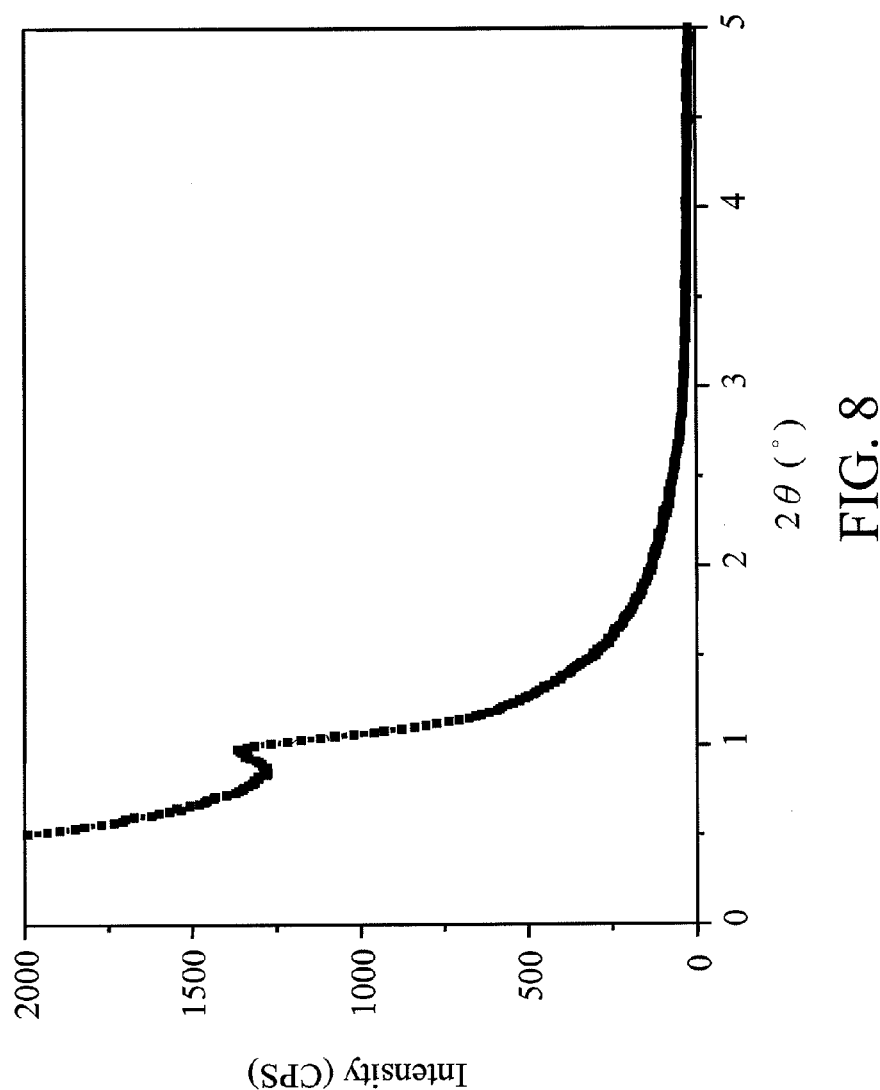
FIG. 8 is a small-angle X-ray diffraction pattern of the mesoporous carbon-nickel composite of the example 2.
Figure 9:
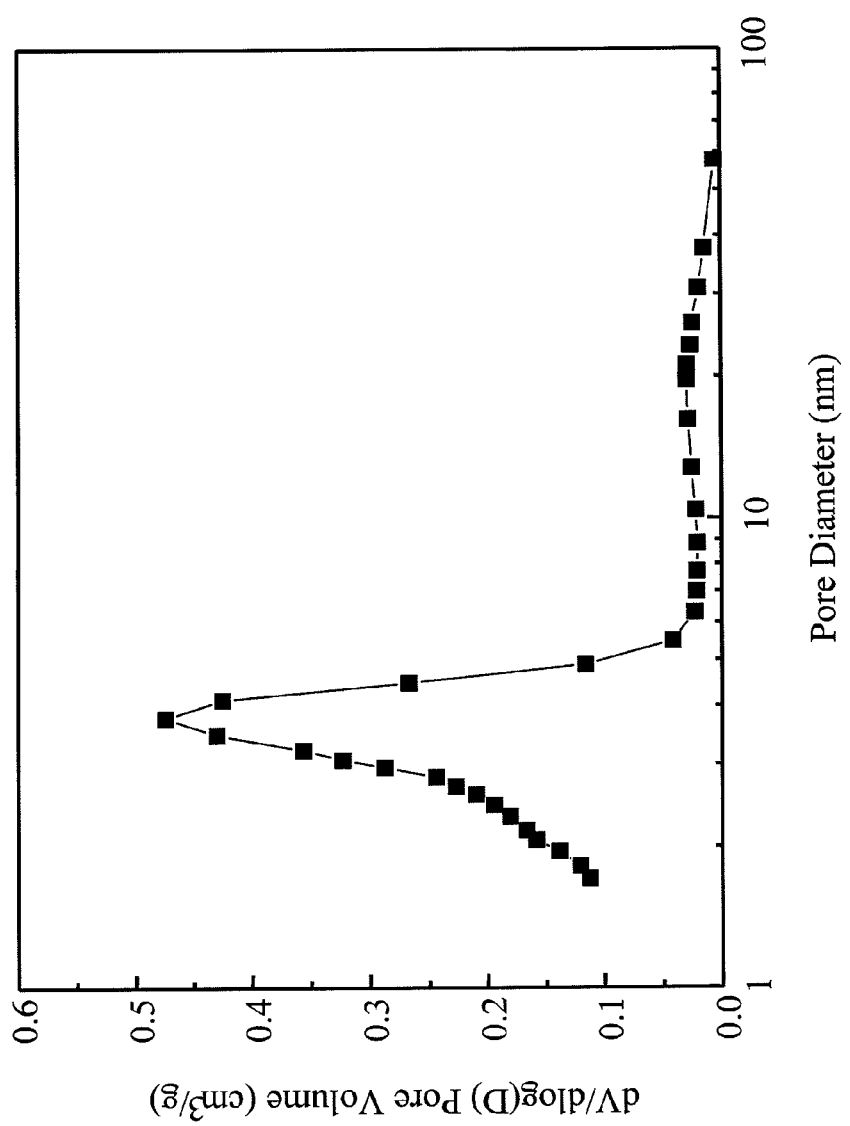
FIG. 9 is a plot for the pore size distribution of the mesoporous carbon-nickel composite of the example 2.
Figure 10:
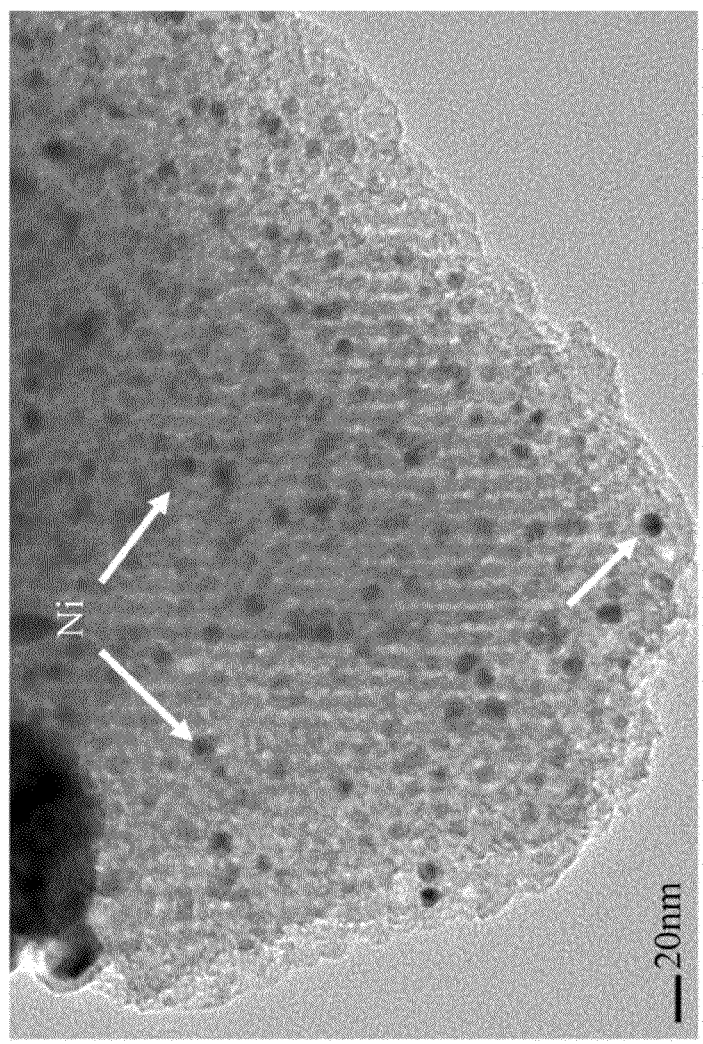
FIG. 10 is a transmission electron micrograph of the mesoporous carbon-nickel composite of the example 2.

Synthesis of Carbon-Nickel Composite 1.0 g of F127 ($EO_{106}PO_{70}EO_{106}$) was dissolved in 18 g of ethanol, and then 1.3 g of 77 wt % phenolic resin was added to form a solution and the solution was stirred for 30 min. Acetic acid was slowly dropped into the solution until the pH level of the solution was approximately 7. Then, 0.73 g of $Ni(NO_3)_2 \cdot 6H_2O$ was added in to the solution to form a mixture. After stirring for 2 hours, the mixture was transferred into dishes to evaporate ethanol at room temperature for 10-16 hours. Then, it took 24 hours at 100° C. in an oven to make the phenolic resin solidify (thermopolymerized). The product, an F127/nickel compound/polymer composite was obtained. Finally, a calcination process was carried out in a tubular furnace under $N_2$ flow at 700° C. for 3 hours to obtain the mesoporous carbon-nickel composite of Example 2. The mesoporous carbon-nickel composite of Example 2 exhibited an ordered hexagonal closed packed structure as evidenced from FIGS. 7 and 8. As shown in FIG. 9, the pore size distribution of the mesoporous carbon-nickel composite of Example 2 was narrow and the specific surface area and pore diameter of the composite of Example 2 were 465 $m^2/g$ and approximately 3.7 nm, respectively. FIG. 10 is a photograph of a transmission electron microscopy (TEM) (TEM) of the ordered hexagonal closed packed structure of the mesoporous carbon-nickel composite of Example 2.

In summary, the mesoporous carbon material of the present invention is incorporated with the features of carbon nanotubes, metal and/or metal oxide particles or a conductive film, thereby reinforcing the meso-structure of the carbon matrix. Due to the electrical conductivity of the carbon nanotubes, the metal and/or the metal oxide particles or the conductive film, electrical conductivity of the mesoporous carbon material is also enhanced. In addition, according to the embodiment of the present invention, the regularity of the pore sizes of the mesoporous carbon material is improved, and the surface area of the mesoporous carbon material is increased.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A carbon material for an energy storage device, having a plurality of mesopores, comprising:
   a carbon matrix; and
   a conductive material embedded in the carbon matrix, wherein the plurality of mesopores are formed by the carbon matrix and the conductive material, and the plurality of mesopores are uniformly arranged.

2. The carbon material of claim 1, wherein the conductive material comprises a plurality of carbon nanotubes, metal particles, metal oxide particles or combinations thereof.

3. The carbon material of claim 2, wherein the conductive material is formed substantially adjacent to the plurality of mesopores.

4. The carbon material of claim 2, wherein the size of at least a part of the conductive material is less than 50 nm.

5. The carbon material of claim 2, wherein at least a part of the plurality of metal particles comprises Ti, Pt, Ag, Au, Al, Ru, Fe, V, Ce, Zn, Sn, W, Ni, Co, Mn, In, Os, Cu or Nb.

6. The carbon material of claim 5, wherein the plurality of metal particles comprises Mn, Co, Ni, Pt, Cu, Ag or Au.

7. The carbon material of claim 2, wherein at least a part of the plurality of metal oxide particles comprises oxides of Ti, Al, Ru, Fe, V, Ce, Zn, Sn, W, Ni, Co, Mn, In, Os, Cu or Nb.

8. The carbon material of claim 7, wherein the plurality of metal oxide particles comprises ZnO, CoO.

9. The carbon material of claim 1, wherein the plurality of mesopores are uniformly arranged in a hexagonal closed packed structure or a cubic closed packed structure.

10. A carbon material for an energy storage device having a plurality of mesopores, comprising:
    a carbon matrix; and
    a conductive material embedded in the carbon matrix,
    wherein the plurality of mesopores are formed by the carbon matrix and the conductive material, and
    at least 75% of the amount of the plurality of mesopores have pore diameters which are 0.6 times to 1.4 times an average pore diameter of the plurality of mesopores.

11. A material for an energy storage device, comprising:
    a mesoporous carbon material having a plurality of mesopores therein; and
    a conductive material embedded in the mesoporous carbon material,
wherein the plurality of mesopores are formed by the mesoporous carbon material and the conductive material.

* * * * *